United States Patent
Gonska

(10) Patent No.: US 10,704,602 B2
(45) Date of Patent: Jul. 7, 2020

(54) BRAKE ROTOR AND TONE RING ASSEMBLY

(71) Applicant: ArvinMeritor Technology, LLC, Troy, MI (US)

(72) Inventor: David Gonska, Beverly Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 178 days.

(21) Appl. No.: 15/984,845

(22) Filed: May 21, 2018

(65) Prior Publication Data

US 2019/0353207 A1    Nov. 21, 2019

(51) Int. Cl.
*F16C 41/00* (2006.01)
*F16D 65/12* (2006.01)
*B60B 27/00* (2006.01)
*B60B 27/02* (2006.01)

(52) U.S. Cl.
CPC ........ *F16C 41/007* (2013.01); *B60B 27/0052* (2013.01); *B60B 27/0068* (2013.01); *B60B 27/02* (2013.01); *F16D 65/123* (2013.01); *F16C 2326/02* (2013.01)

(58) Field of Classification Search
CPC ............... F16C 41/007; F16C 2326/02; B60B 27/0052; B60B 27/0047; B60B 27/0068; B60B 27/02; F16D 65/123
See application file for complete search history.

(56) References Cited

U.S. PATENT DOCUMENTS

| 4,161,120 | A | 7/1979 | Cloarec |
| 4,946,296 | A | 8/1990 | Olschewski |
| 5,031,967 | A | 7/1991 | Svensson |
| 5,476,272 | A | 12/1995 | Hixson |
| 5,695,289 | A | 12/1997 | Ouchi |
| 6,186,667 | B1 | 2/2001 | Nakamura |
| 6,217,220 | B1 | 4/2001 | Ohkuma |
| 6,457,869 | B1 | 10/2002 | Smith |
| 7,219,778 | B2 * | 5/2007 | Pete ......... B60T 8/329 188/18 A |
| 7,455,459 | B2 | 11/2008 | Toth |
| 7,779,969 | B2 | 8/2010 | Gonska |
| 8,020,676 | B2 | 9/2011 | Bradley |
| 8,584,815 | B2 * | 11/2013 | Hester ....... B60T 8/329 188/18 A |
| 9,261,144 | B2 | 2/2016 | Duch |
| 2007/0051571 | A1 * | 3/2007 | Carlson ...... B60T 8/329 188/218 XL |
| 2007/0211974 | A1 | 9/2007 | Toth |
| 2014/0239597 | A1 | 8/2014 | White |

(Continued)

FOREIGN PATENT DOCUMENTS

DE   102014106519 A1   11/2015
EP   0822413 A2   7/1997

(Continued)

*Primary Examiner* — Melanie Torres Williams
(74) *Attorney, Agent, or Firm* — Brooks Kushman PC

(57) ABSTRACT

A wheel end assembly includes a brake rotor that is rotatable about an axis and a tone ring that is secured to the brake rotor. The brake rotor includes a protrusion that extends into a brake rotor opening. The tone ring includes a recess that receives the protrusion to restrict rotational movement of the tone ring with respect to the brake rotor.

20 Claims, 4 Drawing Sheets

(56) References Cited

U.S. PATENT DOCUMENTS

| | | |
|---|---|---|
| 2015/0107742 A1 | 4/2015 | Knapke |
| 2016/0059626 A1 | 3/2016 | Gemello |
| 2016/0318359 A1 | 11/2016 | Knapke |
| 2017/0122390 A1* | 5/2017 | Maronati .............. F16D 65/123 |
| 2018/0313417 A1* | 11/2018 | White .................. F16D 65/123 |

FOREIGN PATENT DOCUMENTS

| | | |
|---|---|---|
| EP | 2980432 A1 | 3/2014 |
| JP | 2004169925 | 6/2004 |

\* cited by examiner

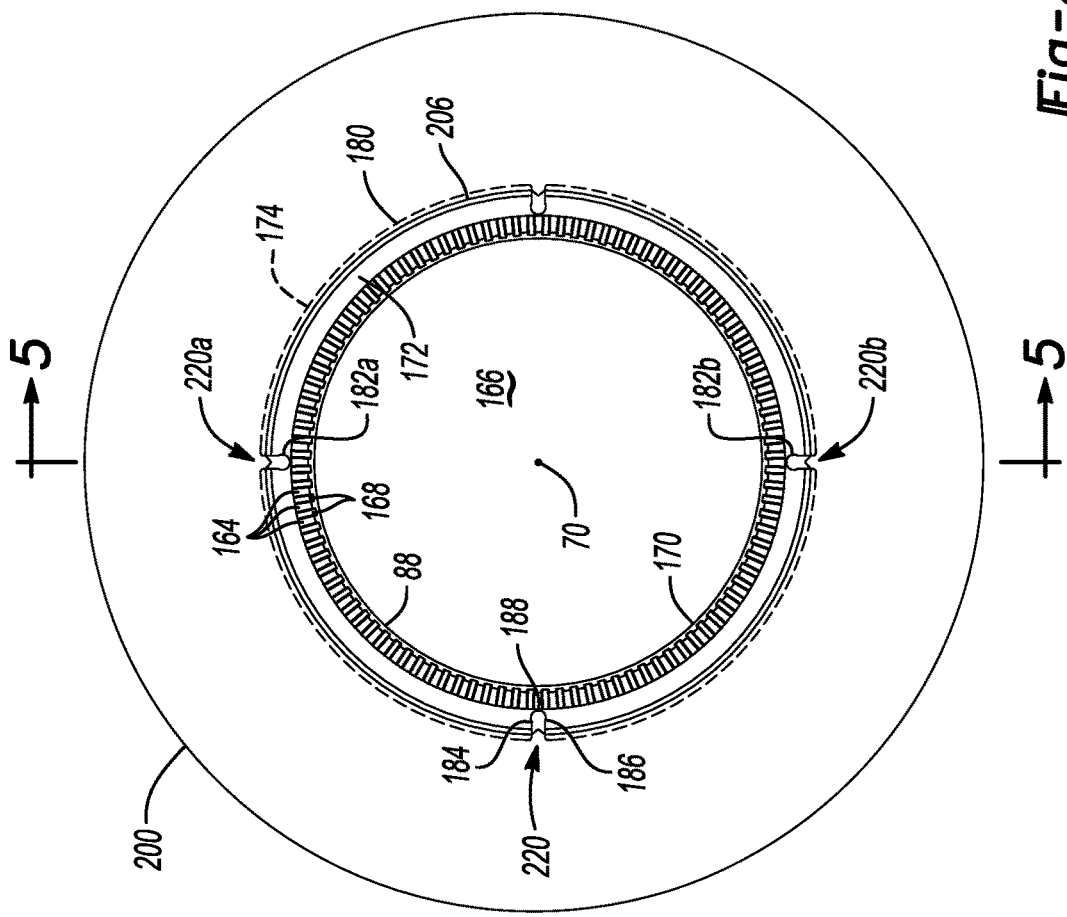
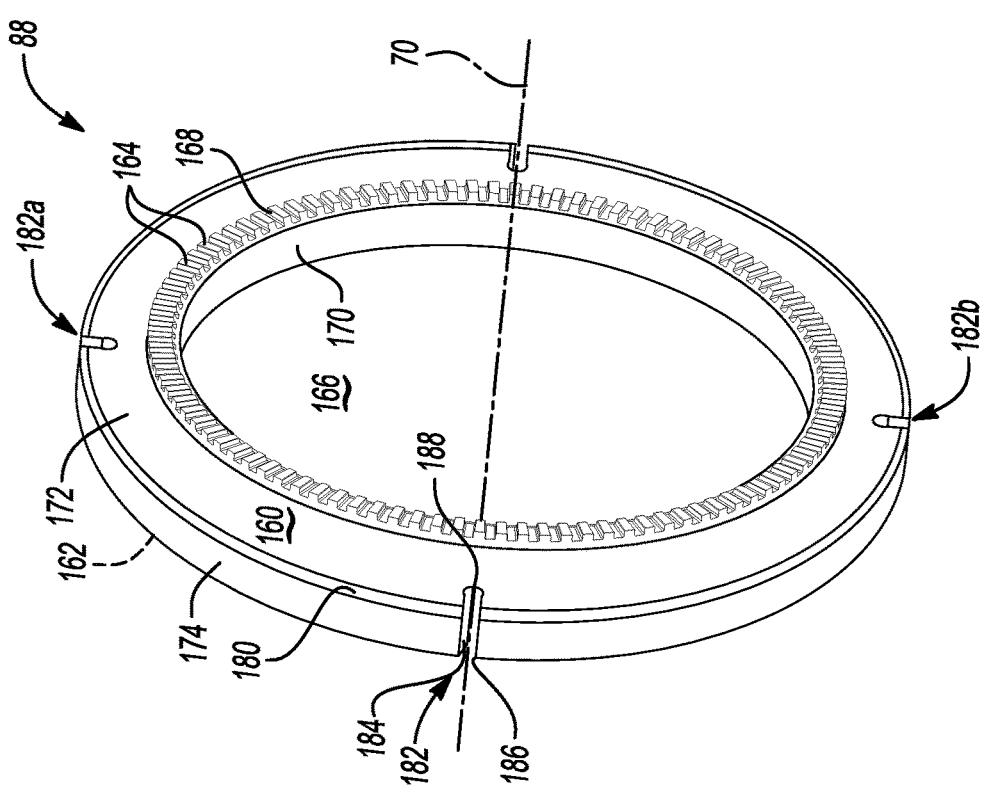

BRAKE ROTOR AND TONE RING ASSEMBLY

TECHNICAL FIELD

This disclosure relates to the wheel end assembly that includes a brake rotor and a tone ring.

BACKGROUND

A wheel assembly that includes a brake rotor and a tone ring is disclosed in U.S. Pat. No. 7,779,969.

SUMMARY

In at least one approach, a wheel end assembly is provided. The wheel end assembly may include a brake rotor that is rotatable about an axis and a tone ring that is secured to the brake rotor. The brake rotor may include an inner rotor surface that faces toward the axis and that at least partially defines a brake rotor opening. The brake rotor may further include a protrusion that is disposed proximate the inner rotor surface and that extends into the brake rotor opening. The tone ring may include a set of teeth that are arranged around the axis, and an outer surface that faces away from the axis. The tone ring may further include a recess that extends from the outer surface toward the axis. The protrusion may engage the tone ring at the recess to restrict rotational movement of the tone ring with respect to the brake rotor.

In at least one approach, a wheel end assembly is provided. The wheel end assembly may include a brake rotor that is rotatable about an axis and a tone ring that is secured to the brake rotor. The brake rotor may include an inner rotor surface that faces toward the axis and that at least partially defines a brake rotor opening. The brake rotor may include a brake rotor opening that is disposed around the axis, and a socket that is disposed in the brake rotor and that extends continuously around the axis. The socket may be located further from the axis than the brake rotor opening. The tone ring may include a set of teeth that are arranged around the axis, and a mounting feature that may be disposed further from the axis than the set of teeth. The mounting feature may be received in the socket to inhibit axial movement of the tone ring with respect to the brake rotor.

BRIEF DESCRIPTION OF THE DRAWINGS

FIG. 3 is a perspective view of a tone ring.

FIG. 4 is a front elevation view of a portion of the wheel end assembly that includes a rotor and a tone ring.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
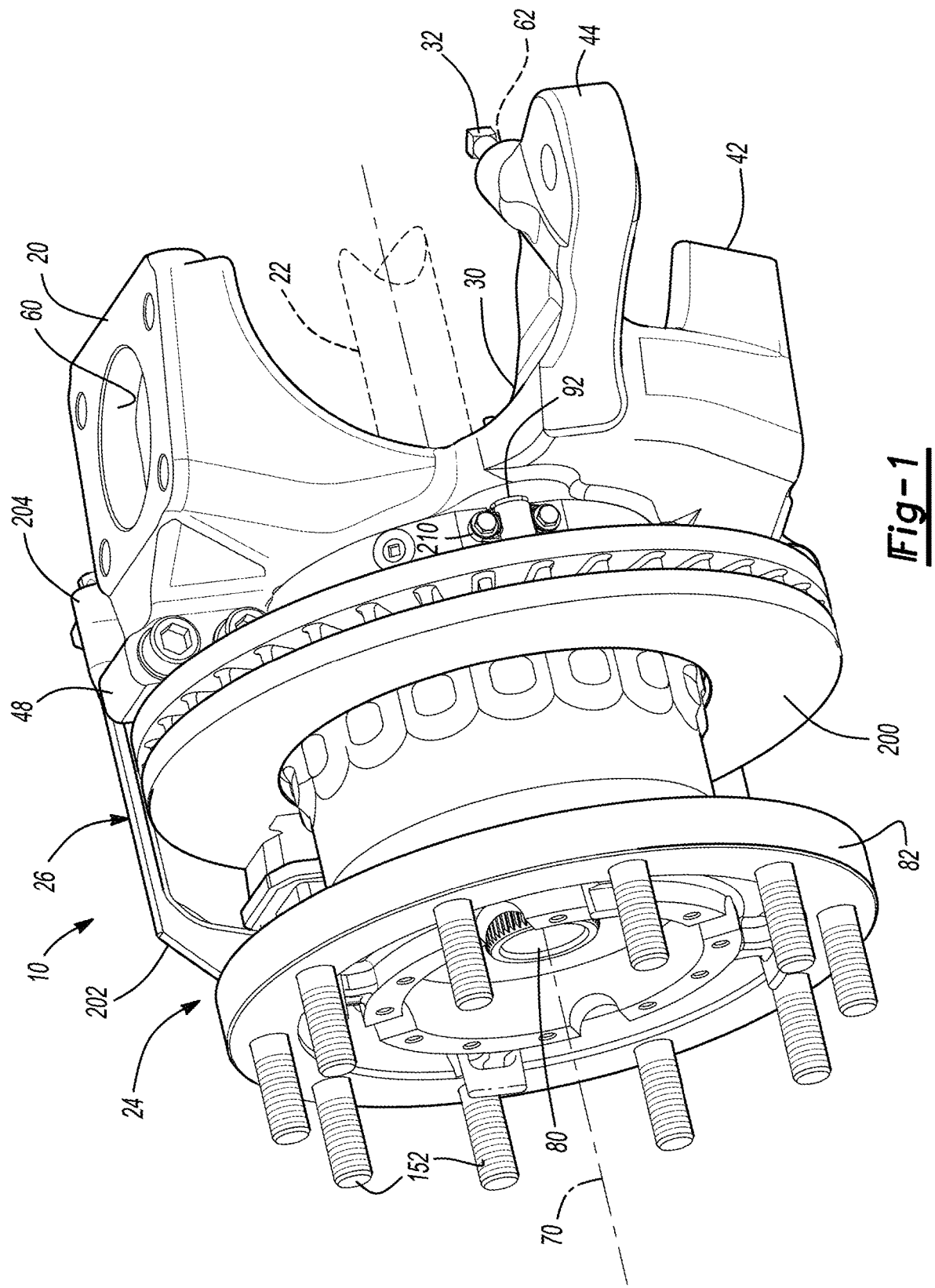
FIG. 1 is a perspective view that shows a wheel end assembly.

Referring to FIG. 1, a portion of an axle assembly 10 is shown. The axle assembly 10 may be provided with a motor vehicle like a truck, bus, farm equipment, military transport or weaponry vehicle, or cargo loading equipment for land, air, or marine vessels or a trailer that may be provided with a motor vehicle.

The axle assembly 10 may be configured as a drive axle that may receive torque from a power source, such as an internal combustion engine or electric motor. Alternatively, the axle assembly 10 may be configured as a non-drive axle in one or more embodiments. In a drive axle configuration, the axle assembly 10 may include a support member 20, an axle shaft 22, a wheel end assembly 24, and a brake subsystem 26. The axle shaft 22 may be omitted in a non-drive axle configuration.

The support member 20 may facilitate mounting of the axle assembly 10 to the vehicle. In FIG. 1, the support member 20 is configured as a steering knuckle that may be pivotally disposed on the axle assembly 10; however, it is contemplated that the support member 20 may associated with a non-steerable axle assembly. For example, the steering knuckle may be omitted on a non-steerable axle assembly and the support member 20 may be an axle housing of the axle assembly 10. The support member 20 that is configured as a steering knuckle will primarily be discussed below.

The steering knuckle may be part of a steering system that may be used to steer or change the direction of the vehicle. Moreover, the steering knuckle may interconnect a vehicle wheel to a structural member or suspension member of the vehicle, such as an axle beam, control arm, or other linkage. In at least one embodiment, the steering knuckle may include a steering knuckle body 30 and a stop bolt assembly 32.

Figure 2:
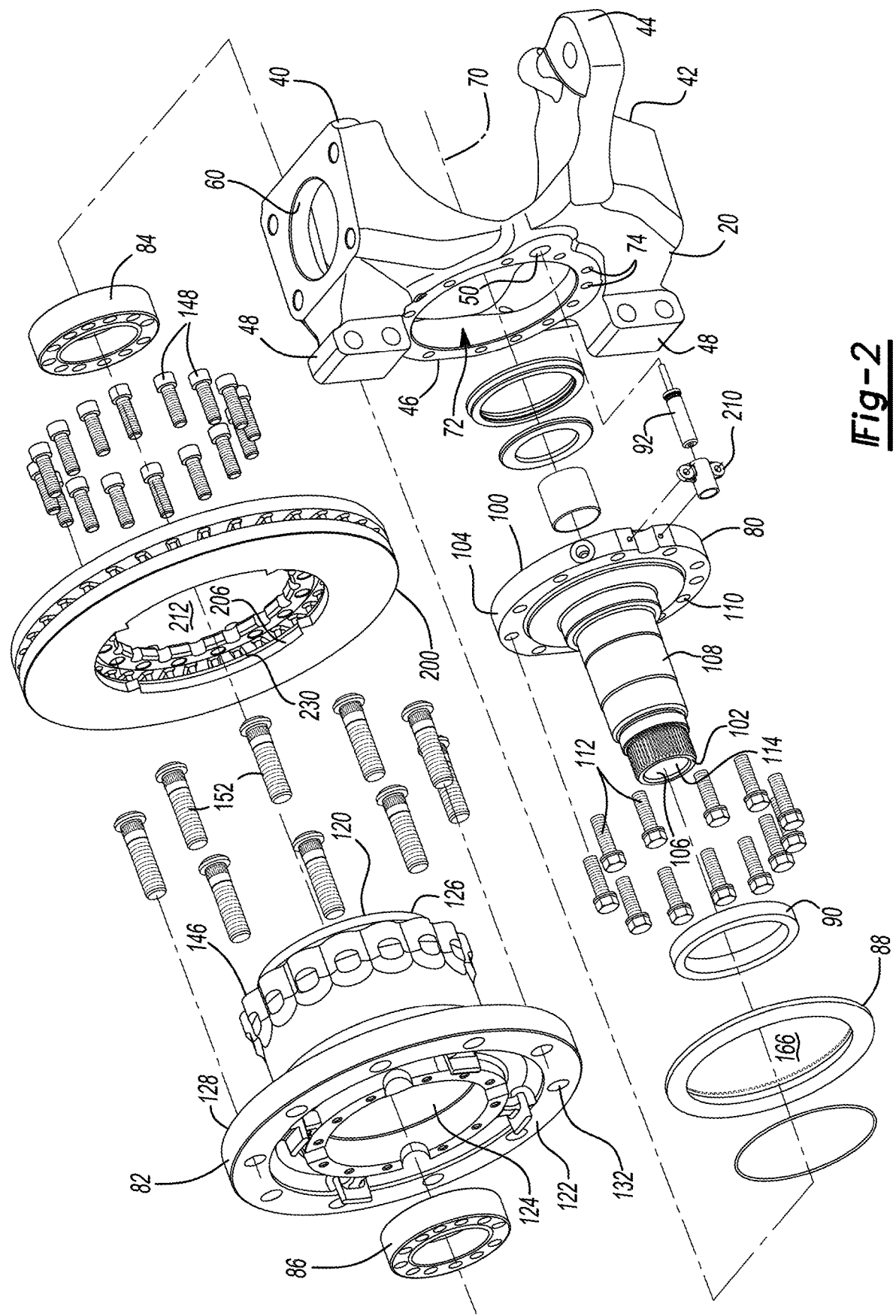
FIG. 2 is an exploded view of a portion of the wheel end assembly.

Referring to FIG. 2, the steering knuckle body 30 may facilitate mounting of various components to the steering knuckle. In at least one embodiment, the steering knuckle body 30 may include a first arm 40, a second arm 42, a tie rod arm 44, a spindle mounting surface 46, one or more brake mounts 48, and a tone ring sensor opening 50.

The first arm 40 may be disposed near the top of the steering knuckle body 30 and may extend away from a brake mount 48. The first arm 40 may include a kingpin hole 60 that may receive a kingpin that may couple the steering knuckle to another vehicle component, such as an axle beam or linkage, such that the steering knuckle may pivot about the kingpin. The kingpin hole 60 may be a through hole that may extend through the first arm 40.

The second arm 42 may be disposed near the bottom of the steering knuckle body 30 and may extend away from another brake mount 48. The second arm 42 may also include a kingpin hole 60 that may receive the kingpin as is best shown in FIG. 3.

The tie rod arm 44 may be disposed between the first arm 40 and the second arm 42. The tie rod arm 44 may transmit force from a steering linkage, such as a tie rod, to the steering knuckle to help rotate the steering knuckle about the kingpin to steer the vehicle. In FIG. 2, the tie rod arm 44 is integrally formed with the steering knuckle body 30; however, it is contemplated that the tie rod arm 44 may be provided as a separate component from the steering knuckle body 30. In at least one configuration, the tie rod arm 44 may include a stop bolt mounting hole 62 that may facilitate mounting of the stop bolt assembly 32.

The spindle mounting surface 46 may extend around an axis 70 and/or an opening 72 in the steering knuckle. A set of spindle mounting holes 74 may be provided in the spindle mounting surface 46. The spindle mounting holes 74 may be spaced apart from each other and may be radially disposed about the axis 70. In addition, the spindle mounting holes 74 may be threaded.

One or more brake mounts 48 may be provided to facilitate mounting of a brake subsystem 26 to the steering knuckle. For example, the brake mounts 48 may facilitate mounting of a brake caliper to the steering knuckle. The brake mounts 48 may extend away from the first and second arms 40, 42, respectively, and may be arranged around the opening 72 in the steering knuckle body 30. In FIG. 2, the brake mounts 48 are integrally formed with the steering knuckle body 30; however, it is contemplated that the brake mounts 48 may be provided as separate components from the steering knuckle body 30.

The tone ring sensor opening 50, if provided, may receive a tone ring sensor that may detect rotation of a wheel as will be discussed in more detail below. The tone ring sensor opening 50 may be disposed proximate the opening 72 and the steering knuckle and may extend through the spindle mounting surface 46.

The stop bolt assembly 32 may be mounted to the steering knuckle. For example, the stop bolt assembly 32 may be received in the stop bolt mounting hole 62 of the tie rod arm 44. The stop bolt assembly 32 may be an adjustable mechanical stop that may control the maximum turn angle of the steering knuckle about the kingpin or a kingpin axis. The maximum turn angle may be measured with respect to a nominal steering knuckle rotational position or a position in which the steering knuckle may be disposed when the vehicle is traveling straight and not turning. A tire associated with the steering knuckle may not rub against the frame or other vehicle components when the stop bolt assembly 32 is properly adjusted.

Referring to FIG. 1, the axle shaft 22 may provide torque to the wheel end assembly 24 to propel the vehicle. For instance, the axle shaft 22 may be operatively connected at a first end to a vehicle drivetrain component, like a differential or input shaft, and may be coupled to the wheel end assembly 24 at a second end. In at least one embodiment, the axle shaft 22 may extend along and may rotate about the axis 70. Alternatively, the axle shaft 22 may be configured for use with an independent suspension system and may have multiple shaft segments and/or joints, such as constant-velocity joints, that may facilitate relative movement between the first end of the axle shaft 22 and the wheel end assembly 24. The axle shaft 22 may be directly or indirectly coupled to a hub of the wheel end assembly 24. For instance, the axle shaft 22 may include an axle flange that may be disposed at a distal end of the axle shaft 22 and that may be fastened to a hub. Alternatively, the axle shaft 22 may be indirectly coupled to the hub, such as via a gear reduction unit that may be provided with the wheel end assembly 24.

The wheel end assembly 24 may facilitate mounting and rotation of a vehicle wheel. As is best shown with reference to FIG. 2, the wheel end assembly 24 may include a spindle 80, a hub 82, a first wheel bearing 84, a second wheel bearing 86, a tone ring 88, a seal 90, and a tone ring sensor 92.

Referring to FIG. 2, the spindle 80 may rotatably support the hub 82. For example, the spindle 80 may support the first wheel bearing 84 and the second wheel bearing 86, which in turn may support and facilitate rotation of the hub 82 and an associated vehicle wheel. In addition, the spindle 80 may extend along or may extend around the axis 70.

The spindle 80 may be fixedly positioned with respect to the support member 20. As such, the spindle 80 may not rotate about the axis 70. For instance, the spindle 80 may be integrally formed with the support member 20 or may be a separate component that may be fixedly mounted to the support member 20. In the configuration shown, the spindle 80 is separate from the steering knuckle and may include a first spindle end surface 100, a second spindle end surface 102, a spindle mounting flange 104, an internal surface 106, and an external surface 108.

The first spindle end surface 100 may be disposed proximate or may engage the support member 20 in configurations where the spindle 80 is a separate component from the support member 20. For instance, the first spindle end surface 100 may be disposed on and may engage the spindle mounting surface 46 of the support member 20. The first spindle end surface 100 may be omitted in configurations where the spindle 80 is integrally formed with the support member 20.

The second spindle end surface 102 may be disposed opposite the first spindle end surface 100. The second spindle end surface 102 may be disposed at a free end or distal end of the spindle 80.

The spindle mounting flange 104 may extend from the first spindle end surface 100 toward the second spindle end surface 102. The spindle mounting flange 104 may extend outwardly away from the axis 70 and may facilitate mounting of the spindle 80 to the support member 20. For example, the spindle mounting flange 104 may include a plurality of mounting flange holes 110 that may extend through the spindle mounting flange 104. The mounting flange holes 110 may be arranged around the axis 70 and may be disposed between an outside circumference of the spindle mounting flange 104 and the internal surface 106. Each mounting flange hole 110 may receive a corresponding fastener 112, such as a bolt, that may couple the spindle 80 to the support member 20. Each fastener 112 may be received in a corresponding spindle mounting hole 74 of the support member 20.

The internal surface 106 may extend between the first spindle end surface 100 and the second spindle end surface 102. The internal surface 106 may at least partially define a spindle hole 114. The axle shaft 22 may extend through the spindle hole 114. The internal surface 106 and the spindle hole 114 may be omitted in a non-drive axle configuration.

The external surface 108 may be disposed opposite the internal surface 106. The external surface 108 may support the first wheel bearing 84 and the second wheel bearing 86 as will be discussed in more detail below.

The hub 82 may be rotatably disposed on the spindle 80. As such, the hub 82 may be configured to rotate about the axis 70. In a drive axle configuration, the hub 82 may be operatively connected to the axle shaft 22. The hub 82 may have a first hub end surface 120, a second hub end surface 122, a hub cavity 124, a first hub mounting flange 126, and a second hub mounting flange 128.

The first hub end surface 120 may face toward the support member 20. In addition, the first hub end surface 120 may extend around the axis 70 and may generally extend around the tone ring 88.

The second hub end surface 122 may be disposed opposite the first hub end surface 120. As is best shown in FIG. 2, the second hub end surface 122 may include a plurality of mounting lug fastener holes 132. The mounting lug fastener holes 132 may be arranged around the axis 70 and may be provided in the second hub mounting flange 128.

The hub 82 may include a plurality of brake rotor fastener holes 146. The brake rotor fastener holes 146 may be arranged around the axis 70. The brake rotor fastener holes 146 may each receive a brake rotor fastener 148, such as a bolt, that may couple a brake rotor to the hub 82.

The second hub mounting flange 128 may be disposed opposite the first hub mounting flange 126. The second hub mounting flange 128 may extend away from the axis 70. For instance, the second hub mounting flange 128 may extend substantially perpendicular to the axis 70 in one or more embodiments. The second hub mounting flange 128 may facilitate mounting of a wheel that may support a tire. For example, the second hub mounting flange 128 may include the mounting lug fastener holes 132 while the wheel may have a wheel mounting flange that may have a set of holes that may each receive a corresponding fastener 152, such as a wheel mounting lug or wheel mounting bolt. A lug nut may be threaded onto each fastener 152 to secure the wheel to the hub 82.

The first wheel bearing 84 may be disposed on the spindle 80 and may rotatably support the hub 82. For example, the first wheel bearing 84 may be disposed on and may extend around the external surface 108 of the spindle 80 and may be received in the hub cavity 124. The first wheel bearing 84 may be positioned closer to the first spindle end surface 100 and the tone ring 88 than the second wheel bearing 86. For example, the first wheel bearing 84 may be axially positioned between the tone ring 88 and the second wheel bearing 86.

The first wheel bearing 84 may have any suitable configuration. For instance, the first wheel bearing 84 may include a plurality of rolling elements, such as balls or rollers, that may be disposed between an inner race and an outer race. The inner race may be disposed on and may extend around the external surface 108 of the spindle 80. The outer race may be disposed on the hub 82 and may extend around the inner race. The outer race may be disposed on the inner side of the first hub mounting flange 126. The first wheel bearing 84 may be larger than the second wheel bearing 86.

The second wheel bearing 86 may also be disposed on the spindle 80 and may rotatably support the hub 82. For example, the second wheel bearing 86 may be disposed on and may extend around the external surface 108 of the spindle 80 and may be received in the hub cavity 124. The second wheel bearing 86 may be positioned closer to the second spindle end surface 102 than the first wheel bearing 84. The second wheel bearing 86 may have any suitable configuration. For instance, the second wheel bearing 86 may include a plurality of rolling elements, such as balls or rollers, that may be disposed between an inner race and an outer race.

The tone ring 88 may be axially positioned between the support member 20 and the hub 82. The tone ring 88 may be fixedly mounted to a brake rotor 200. As such, the tone ring 88 may rotate with the brake rotor 200 about the axis 70. The tone ring 88 may extend continuously around the seal 90 and may inhibit leakage of lubricant or entry of contaminants between the tone ring 88 and the seal 90. The tone ring 88 may be a steel (e.g., stainless steel) component. The stainless steel may be a ferritic stainless steel that may be magnetic. For example, the stainless steel may be a 400 series stainless steel.

Referring to FIG. 1, the brake subsystem 26 may facilitate braking to slow rotation of the hub 82 and a wheel about the axis 70. The brake subsystem 26 may have any suitable configuration. For instance, the brake subsystem 26 may be configured as a friction brake, such as a disc brake or a drum brake. In FIG. 1, a portion of the brake subsystem 26 is shown that has a disc brake configuration. In a disc brake configuration, the brake subsystem 26 may include components such as a brake rotor 200, a bridge 202, and a housing 204. These components are shown to facilitate an abbreviated discussion of the operation of the brake subsystem 26.

Referring to FIGS. 1 and 2, the brake rotor 200 may be fixedly disposed on the hub 82 by way of the brake rotor fasteners 148. As is best shown in FIG. 2, the brake rotor 200 may have an inner rotor surface 206 that faces toward the axis 70 and that at least partially defines a brake rotor opening 212 that may receive the hub 82. The brake rotor 200 may be axially positioned such that the brake rotor 200 extends around the hub 82 and the first wheel bearing 84. The brake rotor 200 may be a cast brake rotor.

Referring to FIG. 1, the bridge 202 may generally extend around the brake rotor 200 and may be fixedly disposed on the housing 204. As such, the bridge 202 may move with the housing 204 with respect to a brake carrier (not shown) when the brake subsystem 26 is actuated.

The housing 204 may be moveably disposed on the brake carrier, which in turn may be fixedly mounted to a component of the axle assembly, such as the support member 20. For example, the housing 204 may slide on a pair of guide pins that may be fixedly disposed on the brake carrier. The housing 204 may receive an actuator that may actuate a pair of brake pad assemblies into engagement with the brake rotor 200. The brake pad assemblies may be received by the brake carrier and may engage opposite sides of the brake rotor 200 when actuated to slow rotation of an associated wheel.

A tone ring sensor mounting bracket 210 may facilitate mounting of the tone ring sensor 92 to a component of the axle assembly 10 that does not rotate about the axis 70. For instance, the tone ring sensor mounting bracket 210 may be fixedly disposed on the support member 20 or the spindle 80. In at least one approach, the tone ring sensor mounting bracket 210 may include an aperture that may receive the tone ring sensor 92. The tone ring sensor mounting bracket 210 may be coupled to the spindle 80 in any suitable manner, such as with one or more fasteners.

Figure 5:
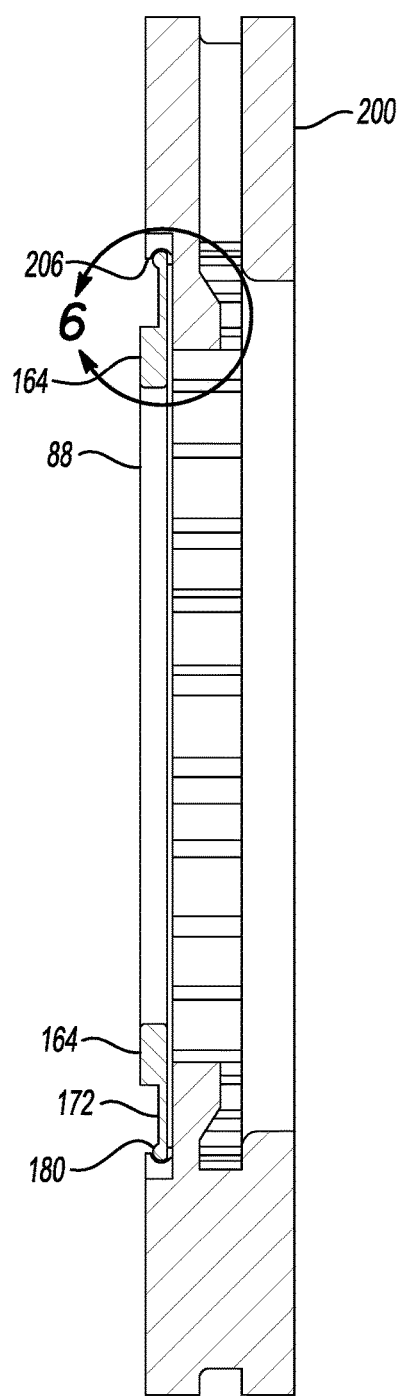
FIG. 5 is a section view along section line 5-5.

Referring to FIGS. 3-5, the tone ring 88 may be configured as a ring and may have a first side 160, a second side 162, a set of tone ring teeth 164, and a tone ring opening 166. The tone ring teeth 164 may be arranged around an axis of rotation (which may correspond to axis 70) in a repeating arrangement. The tone ring teeth 164 may extend along a radial line with respect to the axis 70. A gap 168 may be provided between adjacent tone ring teeth 164.

The tone ring opening 166 may extend from the first side 160 to the second side 162. The tone ring opening 166 may be at least partially defined by an inner tone ring surface 170. The inner tone ring surface 170 may extend around the axis 70 and may be radially disposed with respect to the axis 70. In this way, the inner tone ring surface 170 may define an annular, or substantially annular, surface.

An annular region 172 may be disposed adjacent the tone ring teeth 164. The annular region 172 may define a substantially planar surface at the first side 160, the second side 162, or the first and second sides 160, 162.

The tone ring 88 may include an outer surface 174. The outer surface 174 may face away from the axis 70 and may define an outer or outermost radial perimeter of the tone ring 88. In this way, the outer surface 174 may define an annular, or substantially annular, surface.

In at least one approach, the tone ring 88 may define a mounting feature 180. The mounting feature 180 may be disposed further from the axis 70 than the set of tone ring teeth 164. In this way, the mounting feature 180 may be disposed opposite the annular region 172 from the set of tone ring teeth 164. For example, the mounting feature 180 may be disposed at or adjacent to the outer surface 174 of the tone ring 88. The mounting feature 180 may extend continuously around the axis 70.

The tone ring 88 may define an alignment feature. The alignment feature may be, for example, a recess 182 that extends into the tone ring 88. In this way, the recess 182 may provide a discontinuous surface at the outer surface 174 of the tone ring 88. The tone ring 88 may include a plurality of recesses 182, such as first and second recesses 182a, 182b that may be spaced apart. The recesses 182 may be equidistantly spaced about the axis 70. Although depicted as including four recesses 182, the tone ring 88 may be provided with one, two, three, five, or more recesses 182.

The recesses 182 may extend through the mounting feature 180; for example, from the outer surface 174 toward the axis 70. In at least one approach, the recesses 182 extend in the axial direction from the first side 160 to the second side 162 such that the recesses 182 extend through an entire thickness of the tone ring 88. In still another approach, the recesses 182 may extend from the first side 160 or the second side 162, and may not extend to the opposite side. In this way, the recesses 182 may extend through less than an entire thickness of the tone ring 88.

The recesses 182 may extend in the radial direction through at least a portion of the mounting feature 180. The recesses 182 may further extend through at least a portion of the annular region 172. The mounting feature 180 may extend from one or more of the recesses 182. For example, the mounting feature 180 may between adjacent recesses 182 (e.g., from one recess to an adjacent recess).

A recess 182 may define a first recess surface 184 that may extend from the outer surface 174 and a second recess surface 186 that may also extend from the outer surface 174. In at least one approach, the first recess surface 184 may be spaced apart, and may be disposed parallel to the second recess surface 186. The tone ring 88 may further include a recess end surface 188 that may extend from the first recess surface 184 to the second recess surface 186. The recess end surface 188 may extend along an arc. For example, the recess end surface 188 may be a bulbous recess end surface 188. In this way, the recesses 182 may be formed to have a mushroom shape.

The brake rotor 200 may also define an alignment feature. The alignment feature may be, for example, one or more protrusions 220. The protrusions 220 may be disposed proximate the inner rotor surface 206, and may extend into the brake rotor opening 212 (e.g., toward the axis 70). The brake rotor 200 may be provided with a number of protrusions 220 that correspond to the number of recesses 182 in the tone ring 88, such as a first protrusion 220a that corresponds to the first recess 182a, and a second protrusion 220b that corresponds to the second recess 182b. In still another approach, the brake rotor 200 may be provided with a fewer number of protrusions 220 than the number of recesses 182 provided in the tone ring 88. The protrusions 220 may include at least two protrusion surfaces. The protrusion surfaces may define a non-zero angle between the protrusion surfaces. In the approach shown, the protrusions 220 have a generally triangular shape.

Although the alignment feature of the tone ring 88 is depicted as a female alignment feature, and the alignment feature of the brake rotor 200 is depicted as a male alignment feature, it is expressly contemplated that the nature of the alignment features may be switched.

A wheel end assembly may be assembled, at least in part, by securing the tone ring 88 to the brake rotor 200. As will be appreciated, the tone ring 88 may be press-fit into engagement with the brake rotor.

When the tone ring 88 is secured to the brake rotor 200, the tone ring 88 may be disposed at least partially in the brake rotor opening 212. The set of tone ring teeth 164 may be radially positioned between the tone ring opening 166 and the protrusions 220. The protrusions 220 may extend into opposing recesses 182. For example, the first protrusion 220a may be received in the first recess 182a, and the second protrusion 220b may be received in the second recess 182b. At least a portion of the protrusions 220 (e.g., at one or more protrusion surfaces) may engage at least a portion of the recesses 182 of the tone ring 88 (e.g., at one or more opposing side surfaces). For example, a protrusion 220 may engage a recess at the first recess surface 184 and the second recess surface 186. In at least one approach, the protrusion 220 may be spaced apart from the recess end surface 188.

In this way, the recesses 182 and protrusions 220 may be interfaced to reduce, restrict, or inhibit rotational movement (e.g., in an angular direction) of the tone ring 88 with respect to the brake rotor 200. Rotational movement may be inhibited in a first rotational direction about the axis 70, in a second rotational direction about the axis 70 opposite the first rotational direction, or in both the first and second rotational directions.

Figure 6:
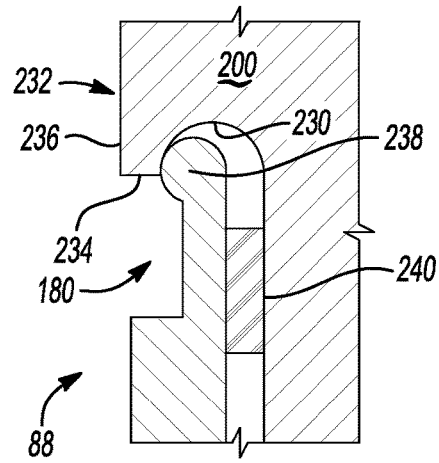
FIG. 6 is a magnified view of a portion of FIG. 5.

Referring to FIG. 6, the brake rotor 200 may include a socket 230 that may be disposed in the brake rotor 200. With reference momentarily to FIG. 2, the socket 230 may be located further from the axis 70 than the brake rotor opening 212. The mounting feature 180 of the tone ring 88 may be received in the socket 230. In this way, the tone ring 88 may be secured to the brake rotor 200 such that axial movement of the tone ring 88 (e.g., along axis 70) relative to the brake rotor 200 may be substantially reduced, restricted, or inhibited.

More particularly, the brake rotor 200 may include a lip 232 that may be disposed adjacent to the socket 230. The lip 232 may have a lip end surface 234 that may extend from the socket 230 to a first side 236 of the brake rotor 200. In the approach shown in FIG. 6, the socket 230 may be open in a direction that faces toward a central axis of the brake rotor 200 (e.g., axis 70). The lip end surface 234 may also face toward the axis. The socket 230 may extend further from the axis than the lip end surface 234. The mounting feature 180 may include an enlarged bead 238. The enlarged bead 238 may be received in the socket 230, and may be disposed in engagement with the lip 232.

In at least one approach, a biasing member 240 may be provided. The biasing member may be a spring, a wave washer, a diaphragm, or other suitable biasing member. The biasing member 240 may extend from the brake rotor 200 to the tone ring 88 (e.g., the second side 162 at the mounting feature 180). In this way, the biasing member 240 may exert a biasing force that urges the mounting feature 180 in an axial direction against the lip 232.

Figure 7:
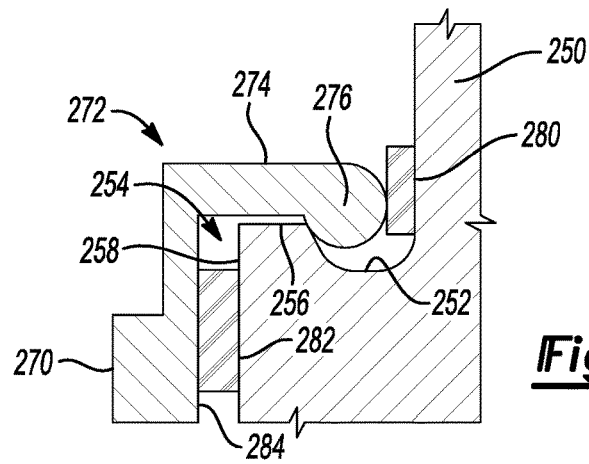
FIG. 7 is a magnified view of a portion of another brake rotor and tone ring assembly.
Figure 8:
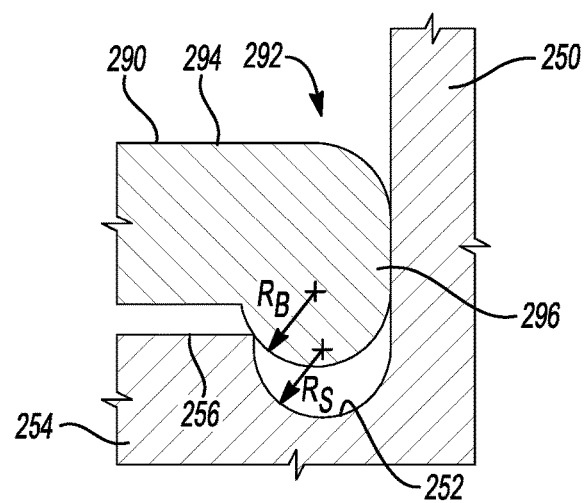
FIG. 8 is a magnified view of a portion of the brake rotor of FIG. 7 and another tone ring.

Referring now to FIGS. 7 and 8, a brake rotor 250 may be provided with a socket 252 that faces away from a central axis of the brake rotor 250 (e.g., axis 70). The brake rotor 250 may include a lip 254 that may be disposed adjacent to the socket 252. The lip 254 may have a lip end surface 256 that may extend from the socket 252 to a first side 258 of the brake rotor 250. The lip end surface 256 may face away from the axis. The lip end surface 234 may extend further from the axis than the socket 252.

Referring to FIG. 7, a tone ring 270 may include a mounting feature 272 that may include an arm segment 274 that may extend in an axial direction toward the brake rotor 250. The mounting feature 272 may further include an enlarged bead 276 that may be disposed at an end of the arm segment 274. The enlarged bead 276 may be received in the socket 252, and may be disposed in engagement with the lip 254.

In at least one approach, one or more biasing members may be provided. The biasing member may be a spring, a wave washer, a diaphragm, or other suitable biasing member. For example, a first biasing member 280 may extend from the brake rotor 250 (e.g., at least partially disposed within the socket 252) to the enlarged bead 276. A second biasing member 282 may be extend from brake rotor 250 to an opposing surface 284 of the tone ring 270. In this way, the biasing members may exert a biasing force that urges the mounting feature 272 in an axial direction against the lip 254.

Referring to FIG. 8, a tone ring 290 may include a mounting feature 292 that may include an arm segment 294 that may extend in an axial direction toward the brake rotor 250. The mounting feature 292 may further include an enlarged bead 296 that may be disposed at an end of the arm segment 274. The enlarged bead 296 may be received in the socket 252, and may be disposed in engagement with the lip 254. In the approach shown, the enlarged bead 296 may have a radius $R_B$ that is greater than the radius $R_S$ of the socket 252. In this way, the enlarged bead 296 may be disposed in a press-fit engagement with the brake rotor 250 at the socket 252 and lip 254.

In at least one approach, an adhesive (which may be a high temperature adhesive) may be provided to further secure the tone ring to the brake rotor. The adhesive may further provide dampening characteristics.

Referring to FIGS. 1 and 2, the tone ring sensor 92 may be provided with an antilock brake system and may be configured to detect rotation of the hub 82 about the axis 70. More specifically, the tone ring sensor 92 may detect the presence or absence of the tone ring teeth 164 or the gaps between the tone ring teeth 164 as the hub 82 rotates about the axis 70. As such, the tone ring sensor 92 may provide a corresponding signal that may be indicative of rotation of the hub 82 and wheel.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A wheel end assembly comprising:
a brake rotor that is rotatable about an axis, the brake rotor including:
an inner rotor surface that faces toward the axis and at least partially defines a brake rotor opening; and
a protrusion that is disposed proximate the inner rotor surface and that extends into the brake rotor opening; and
a tone ring that is secured to the brake rotor, the tone ring including:
a set of teeth that is arranged around the axis;
an outer surface that faces away from the axis; and
a recess that extends from the outer surface toward the axis, wherein the protrusion engages the tone ring at the recess to restrict rotational movement of the tone ring with respect to the brake rotor, wherein the recess is at least partially defined by a first recess surface that extends from the outer surface, a second recess surface that extends from the outer surface, and a recess end surface that extends along an arc and extends from the first recess surface to the second recess surface, and wherein the protrusion engages the first recess surface and the second recess surface and is spaced apart from the recess end surface.

2. The wheel end assembly of claim 1 wherein the tone ring is disposed at least partially in the brake rotor opening.

3. The wheel end assembly of claim 1 wherein the tone ring includes a second recess that is spaced apart from the recess and the brake rotor includes a second protrusion that is spaced apart from the protrusion, wherein the second protrusion is received in the second recess.

4. The wheel end assembly of claim 1 wherein the first recess surface is spaced apart from and disposed parallel to the second recess surface.

5. The wheel end assembly of claim 1 wherein the tone ring defines a tone ring opening that extends through the tone ring and extends around the axis, wherein the set of teeth is radially positioned between the tone ring opening and the protrusion.

6. The wheel end assembly of claim 1 wherein the tone ring further includes a mounting feature that extends around the axis and is disposed proximate the outer surface, wherein the mounting feature engages the brake rotor to restrict axial movement of the tone ring.

7. A wheel end assembly comprising:
a brake rotor that is rotatable about an axis, the brake rotor including:

a brake rotor opening that is disposed around the axis; and a socket that is disposed in the brake rotor and that extends continuously around the axis, wherein the socket is located further from the axis than the brake rotor opening; and a tone ring that is secured to the brake rotor, the tone ring including:

a set of teeth that is arranged around the axis; and a mounting feature that is disposed further from the axis than the set of teeth, wherein the mounting feature includes an enlarged bead disposed at an end of the mounting feature that is received in the socket to inhibit axial movement of the tone ring with respect to the brake rotor.

8. The wheel end assembly of claim 7 wherein the mounting feature extends continuously around the axis.

9. The wheel end assembly of claim 7 wherein the brake rotor and the tone ring have interfacing alignment features that inhibit rotational movement of the tone ring with respect to the brake rotor.

10. The wheel end assembly of claim 7 wherein the brake rotor has a lip disposed adjacent to the socket, the lip having a lip end surface that extends from the socket to a first side of the brake rotor.

11. The wheel end assembly of claim 10 wherein the socket is open in a direction that faces toward the axis, the lip end surface faces toward the axis, and the socket extends further from the axis than the lip end surface.

12. A wheel end assembly comprising:

a brake rotor that is rotatable about an axis, the brake rotor including:

a brake rotor opening that is disposed around the axis; and a socket that is disposed in the brake rotor and that extends continuously around the axis, wherein the socket is located further from the axis than the brake rotor opening; and a tone ring that is secured to the brake rotor, the tone ring including:

a set of teeth that is arranged around the axis;

a mounting feature that is disposed further from the axis than the set of teeth, wherein the mounting feature is received in the socket to inhibit axial movement of the tone ring with respect to the brake rotor;

an outer surface that faces away from the axis; and a recess that extends from the outer surface toward the axis, wherein the mounting feature extends from the recess.

13. A wheel end assembly comprising:

a brake rotor that is rotatable about an axis, the brake rotor including:

a brake rotor opening that is disposed around the axis;

a socket that is disposed in the brake rotor and that extends continuously around the axis, wherein the socket is located further from the axis than the brake rotor opening; and a lip disposed adjacent to the socket, the lip having a lip end surface that extends from the socket to a first side of the brake rotor; and a tone ring that is secured to the brake rotor, the tone ring including:

a set of teeth that is arranged around the axis; and mounting feature that is disposed further from the axis than the set of teeth, wherein the mounting feature is received in the socket to inhibit axial movement of the tone ring with respect to the brake rotor; and a biasing member that extends from the brake rotor to the mounting feature and that exerts a biasing force that urges the mounting feature in an axial direction against the lip.

14. The wheel end assembly of claim 13 wherein the mounting feature includes an enlarged bead disposed at an end of the mounting feature, wherein the enlarged bead is received in the socket.

15. The wheel end assembly of claim 13 wherein the brake rotor and the tone ring have interfacing alignment features that inhibit rotational movement of the tone ring with respect to the brake rotor.

16. A wheel end assembly comprising:

a brake rotor that is rotatable about an axis, the brake rotor including:

a brake rotor opening that is disposed around the axis;

a socket that is disposed in the brake rotor and that extends continuously around the axis, wherein the socket is located further from the axis than the brake rotor opening; and a lip disposed adjacent to the socket, the lip having a lip end surface that extends from the socket to a first side of the brake rotor; and a tone ring that is secured to the brake rotor, the tone ring including:

a set of teeth that is arranged around the axis; and a mounting feature that is disposed further from the axis than the set of teeth, wherein the mounting feature is received in the socket to inhibit axial movement of the tone ring with respect to the brake rotor, wherein the socket is open in a direction that faces away from the axis, the lip end surface faces away from the axis, and the lip end surface extends further from the axis than the socket.

17. The wheel end assembly of claim 16 wherein the mounting feature includes an arm segment that extends in an axial direction toward the brake rotor and an enlarged bead disposed at an end of the arm segment, wherein the enlarged bead is received in the socket.

18. The wheel end assembly of claim 17 further comprising a biasing member that extends from the brake rotor to the enlarged bead and that exerts a biasing force that urges the enlarged bead in an axial direction against the lip.

19. The wheel end assembly of claim 16 wherein the mounting feature has an enlarged bead that has a radius that is greater than a radius of the socket.

20. The wheel end assembly of claim 16 wherein the brake rotor and the tone ring have interfacing alignment features that inhibit rotational movement of the tone ring with respect to the brake rotor.

* * * * *